United States Patent
Zheng

(10) Patent No.: US 10,371,868 B2
(45) Date of Patent: Aug. 6, 2019

(54) PROCESS FOR THE MANUFACTURING OF AN OPTICAL ARTICLE AND OPTICAL ARTICLE

(71) Applicant: ESSILOR INTERNATIONAL (COMPAGNIE GENERALE D'OPTIQUE), Charenton-le-Pont (FR)

(72) Inventor: Haipeng Zheng, Dallas, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 458 days.

(21) Appl. No.: 14/906,814

(22) PCT Filed: Jul. 23, 2013

(86) PCT No.: PCT/IB2013/001715
§ 371 (c)(1),
(2) Date: Jan. 21, 2016

(87) PCT Pub. No.: WO2015/011513
PCT Pub. Date: Jan. 29, 2015

(65) Prior Publication Data
US 2016/0170095 A1    Jun. 16, 2016

(51) Int. Cl.
| | |
|---|---|
| G02B 1/111 | (2015.01) |
| G02B 27/00 | (2006.01) |
| B05D 7/00 | (2006.01) |
| C09D 5/00 | (2006.01) |
| C09D 7/61 | (2018.01) |
| C08K 3/22 | (2006.01) |
| C08K 3/34 | (2006.01) |

(52) U.S. Cl.
CPC ............. *G02B 1/111* (2013.01); *B05D 7/50* (2013.01); *C09D 5/006* (2013.01); *C09D 7/61* (2018.01); *G02B 27/0006* (2013.01); *C08K 3/22* (2013.01); *C08K 3/34* (2013.01)

(58) Field of Classification Search
CPC .......... G02B 1/111; C09D 7/61; C09D 5/006; B05D 7/50
See application file for complete search history.

(56) References Cited

U.S. PATENT DOCUMENTS

| | | | | |
|---|---|---|---|---|
| 5,873,931 | A * | 2/1999 | Scholz .................. | A41D 13/11 100/13 |
| 2007/0104922 | A1 | 5/2007 | Zhai et al. ................. | 428/141 |
| 2008/0038458 | A1 | 2/2008 | Gemici et al. ............. | 427/180 |
| 2010/0304150 | A1 | 12/2010 | Zheng et al. .............. | 428/414 |
| 2012/0028005 | A1 * | 2/2012 | Zheng .................. | C09D 5/1693 428/212 |

FOREIGN PATENT DOCUMENTS

| | | |
|---|---|---|
| EP | 0614957 | 9/1994 |
| WO | WO 2012/013739 | 2/2012 |
| WO | WO 2012/013740 | 2/2012 |

OTHER PUBLICATIONS

Shchipunov et al; Hybrid polysaccharide-silica nanocomposites prepared by the sol-gel technique; Langmuir, 2004; 20; pp. 3882-3887. (Year: 2004).*
Shchipunov et al. "Gelling of otherwise nongelable polysaccharides," *Journal of Colloid and Interface Science* 287 (2005), 373-378.

* cited by examiner

*Primary Examiner* — Elizabeth A Burkhart
(74) *Attorney, Agent, or Firm* — Norton Rose Fulbright US LLP

(57) ABSTRACT

The invention relates to a process for the manufacturing of an optical article comprising forming a multilayered coating on at least one face of an uncoated or coated substrate, and forming on the outermost layer of said multilayered coating, a layer-by-layer (LbL) coating exposed to environment, said LbL coating comprising at least two bilayers, each bilayer being formed successively by: i) applying a first layer composition comprising at least one compound A having a first electrical charge; ii) applying, directly onto the first layer resulting from i), a second layer composition comprising at least one compound B having a second electrical charge, said second electrical charge being opposite to said first electrical charge; iii) repeating at least once steps i) and ii), with the provisos that: -each of compounds A and B is independently chosen from polysaccharide polymers and colloids of metal oxide such as $TiO_2$ and $ZrO_2$ or silicon oxide, with the proviso that at least one of the compounds A and B is a polysaccharide polymer, -each of said compounds A and B is positively or negatively charged respectively, and d) crosslinking the first and second layers of said bilayers of the LbL coating by treatment with an aqueous composition comprising at least tetrakis(2-hydroxyethyl) orthosilicate (THEOS) as crosslinking agent to induce chemical linkages between compounds A and B. The invention also relates to the optical substrate obtained according to this process.

21 Claims, No Drawings

PROCESS FOR THE MANUFACTURING OF AN OPTICAL ARTICLE AND OPTICAL ARTICLE

CROSS-REFERENCE TO RELATED APPLICATIONS

This application is a national phase application under 35 U.S.C. § 371 of International application No. PCT/IB2013/001715 filed 23 Jul. 2013, the entire contents of which is specifically incorporated by reference herein without disclaimer.

TECHNICAL FIELD

The invention relates to the field of optical articles comprising a multilayered coating, especially an antireflecting coating. In particular this invention relates to a process for the manufacturing of optical articles comprising an anti-reflective layer-by-layer coating and to the optical articles comprising an anti-reflective layer-by-layer coating obtained by this process, especially ophthalmic lenses for eyeglasses.

The invention is based on the use of a specific combination between at least one electrically charged polysaccharide polymer and a crosslinking aqueous solvent-based composition comprising at least tetrakis(2-hydroxyethyl) orthosilicate (THEOS) as crosslinking agent, said combination enhancing the mechanical properties of said LbL coating, in particular adhesion.

BACKGROUND

It is known that a layer-by-layer (LbL) coating can be assembled on a substrate from specifies having opposite electric charges. More precisely, positively and negatively charged polyelectrolytes can be alternatively deposited on a substrate.

For this purpose, at least two different polyelectrolyte solutions opposite charges, or a polyelectrolyte solution and a nanoparticles solution having opposite charges, may be used to form the LbL coating.

By selecting the materials of the layers and the deposition process conditions, such films can be anti-reflective, hydrophilic or superhydrophilic, hydrophobic or super hydrophobic.

LbL coatings having hydrophilic properties may also have anti-fog properties. US patent application 2007/0104922 discloses superhydrophilic LbL coatings that can be anti-reflective and anti-fog, such as poly(allylamine hydrochloride)/$SiO_2$ LbL coatings.

However, the LbL coatings exhibit generally poor mechanical properties due to a high porosity, especially poor adhesion to substrate, either naked or already coated by classical hard coat. Most of the LbL coatings are easily wiped off by dry or wet cloth, showing very poor adhesion to the substrate or poor cohesion of the coatings themselves.

It has already been proposed to increase mechanical properties of LbL coatings by calcination treatment, generally at high temperatures (typically around 550° C.). A disadvantage associated to this solution is that it cannot be applied on any organic substrates and it is only adapted to substrates that can withstand high temperature like glass substrates.

US patent application 2008/0038458 discloses a hydrothermal calcination of $TiO_2/SiO_2$ coatings, typically at pressure in the range of 10 psi to 30 psi (i.e. $7 \times 10^4$ Pa to $21 \times 10^4$ Pa) at temperature less than 500° C., in order to improve the abrasion resistance of the coatings. Such hydrothermal treatment affects the anti-fog properties of the coating.

More recently, it has also been proposed, in international application WO 2012/013739, to improve the cohesion of the LbL layer by a process of manufacturing an optical device comprising a substrate having one main surface bearing hydroxyl groups coated with an intermediate layer comprising at least one hydroxylated and amino-functionalized siloxane oligomer, and forming on this intermediate layer an anti-fog layer-by-layer coating consisting of at least two bilayers obtained by: (a) forming a first layer on the intermediate layer by applying a first composition comprising a polyelectrolyte obtained from carboxyalkylcelluloses or a polyelectrolyte selected from polyacrylic acid (PAA), poly(methacrylic acid) (PMAA), PAA copolymer, PMAA copolymer or mixtures thereof, (b) forming a second layer on the first layer by applying a second composition comprising a polyelectrolyte obtained from polysaccharide including glucosamine units when the first layer comprises a polyelectrolyte obtained from carboxyalkylcelluloses or metal oxide or silicon oxide nanoparticles which are surface functionalized with amino groups when the first layer comprises the polyelectrolyte obtained from PAA, PMAA, PAA copolymer or PMAA copolymer, (c) optionally repeating at least once steps (a) and (b); and (d) crosslinking the layers of the LbL coating by treatment with a composition of a coupling agent. According to this international application, the coupling agent is chosen among carbodiimides of formula $N(CH_3)_2—(CH_2)n-N=C=N—CH_2CH_3$, wherein n is an integer from 2 to 6, such as for example 1-ethyl-3 (3-dimethylaminopropyl) carbodiimide (EDC). These coupling agents are used in combination with N-hydrosuccinimide (NHS), sulfohydroxysuccinimides or N-hydroxybenzotriazole to increase coupling efficiency and decrease side reactions. This process involves many steps including a step of applying an intermediate layer on the substrate to promote the adhesion of the LbL coating to the substrate.

This invention provides an alternative and simple approach to enhance the adhesion of the LbL coating to the substrate and/or the cohesion between LbL coating, while keeping the functional properties of coatings such as anti-fog properties.

SUMMARY

An object of the invention is to improve the mechanical durability of a multilayered coating, especially adhesion properties while maintaining the intrinsic properties of said coating, in particular anti-reflective properties.

A further object of the invention is to provide a multilayered coated optical article having the improved mechanical properties mentioned above without altering its intrinsic properties, especially its anti-reflective properties.

The invention discloses a process for the manufacturing of an optical article comprising a substrate and a multilayered coating, in particular a multilayered antireflecting coating, applied on at least one face of said substrate, said multilayered coating including an outermost layer-by-layer (LbL) coating exposed to environment and comprising at least two bilayers. The process of the invention makes it possible to improve the adhesion and cohesion of said LbL coating at the surface of the substrate. Additional advantages of the invention process include low temperature conditions (50° C. to 70° C.), no change of multilayered coating functionality (anti-reflecting properties for example), short time (less or equal to 3 hours), and environment-friendly (water-based/ no organic solvent) process.

The process according to the invention comprises at least the following steps:

a) providing an uncoated or coated substrate, b) forming on at least one face of said substrate a multilayered coating, c) forming on the outermost layer of said multilayered coating, a layer-by-layer (LbL) coating exposed to environment, said LbL coating comprising at least two bilayers, each bilayer being formed successively by:

i) applying a first layer composition comprising at least one compound A having a first electrical charge;

ii) applying, directly onto the first layer resulting from i), a second layer composition comprising at least one compound B having a second electrical charge, said second electrical charge being opposite to said first electrical charge;

iii) repeating at least once steps i) and ii), with the provisos that:

each of compounds A and B is independently chosen from polysaccharide polymers and colloids of metal oxide such as $TiO_2$ and $ZrO_2$ or silicon oxide, with the proviso that at least one of the compounds A and B is a polysaccharide polymer, each of said compounds A and B is positively or negatively charged respectively, and d) crosslinking the first and second layers of said bilayers of the LbL coating by treatment with an aqueous composition comprising at least tetrakis(2-hydroxyethyl) orthosilicate (THEOS) as crosslinking agent to induce chemical linkages between compounds A and B.

The invention also relates to the optical article comprising a substrate having a multilayered coating obtainable by implementing the above described process.

More precisely, said optical article comprises a substrate, a multilayered coating being applied on at least one face of said substrate, said multilayered coating including an outermost layer-by-layer (LbL) coating exposed to environment, said LbL coating comprising at least two bilayers, each bilayer being formed successively by:

i) applying a first layer composition comprising at least one compound A having a first electrical charge;

ii) applying, directly onto the first layer resulting from i), a second layer composition comprising at least one compound B having a second electrical charge, said second electrical charge being opposite to said first electrical charge;

wherein each of compounds A and B is independently chosen from polysaccharide polymers and colloids of metal oxide such as $TiO_2$ and $ZrO_2$ or silicon oxide, with the proviso that at least one of the compounds A and B is a polysaccharide polymer, each of said compounds A and B is positively or negatively charged respectively, and said LbL coating is crosslinked through chemical linkages between compounds A and B with an aqueous composition comprising at least tetrakis(2-hydroxyethyl) orthosilicate (THEOS) as crosslinking agent.

In a preferred embodiment each bilayer of said LbL coating comprises:

a) a first layer of chitosan as compound A and a second layer of carboxymethyl cellulose as compound B; or b) a first layer of aminopropyl-functionalized $SiO_2$ nanoparticles as compound A and a second layer of carboxymethyl cellulose as compound B; or c) a first layer of chitosan as compound A and a second layer of $SiO_2$ as compound B.

Other objects, features and advantages of the present invention will become apparent from the following detailed description.

DETAILED DESCRIPTION

The terms "comprise" (and any grammatical variation thereof, such as "comprises" and "comprising"), "have" (and any grammatical variation thereof, such as "has" and "having") contain (and any grammatical variation thereof, such as "contains" and "containing"), and include (and any grammatical variation thereof, such as "includes" and "including") are open-ended linking verbs. They are used to specify the presence of stated features, integers, steps or components groups thereof, but do not preclude the presence or addition of one or more other features, integers, steps or components or groups thereof. As a result, a method, or a step in a method, that "comprises", "has", "contains", or "includes" one or more steps or elements possessing those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about".

When an optical article comprises one or more surface coatings, the phrase "to deposit a coating layer onto the optical article" means that a coating or layer is deposited onto the outermost coating of the optical article, i.e. the coating which is the closest to the air.

A coating that is "on" a side of a lens is defined as a coating that (a) is positioned over that side, (b) needs not be in contact with that side, i.e., one or more intervening coatings may be disposed between that side and the coating in question, and (c) needs not cover that side completely.

As used herein, the phrase "last layer" means a monolayer or a multilayer which is in contact with the environmental air.

As used herein, the phrase "outermost coating" or "outermost layer" means a coating or a layer which is the farthest from the substrate and conversely the phrase "innermost coating" of innermost layer" means a coating or a layer which is the closest to the substrate.

As used herein, the term "substrate" means a naked substrate or a naked substrate already coated with one or several functional coatings.

The optical article prepared according to the present invention is a transparent optical article, preferably a lens or lens blank, and more preferably an ophthalmic lens or lens blank. The optical article may be coated on its convex main side (front side (Cx)), concave (Cc) main side (back side), or both sides using the process of the invention.

Herein, the term "lens" means an organic or inorganic glass lens, comprising a lens substrate which may be coated with one or more coatings of various natures.

The lens naked substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonate (PC) and diethylene glycol bis(allylcarbonate) polymers, in particular substrates made of polycarbonate.

The surface of the article onto which the LbL coating will be applied may optionally be subjected to a pre-treatment step intended to improve the adhesion, for example a high-frequency discharge plasma treatment, a glow discharge plasma treatment, a corona treatment, an electron beam treatment, an ion beam treatment, an acid or base treatment.

The LbL coating of the invention may be deposited onto the outermost layer of a multilayered coated substrate. Said multilayered coating may be, without limitation, an anti-reflecting coating, an impact-resistant coating (impact resistant primer), an abrasion and/or scratch resistant coating, a polarized coating, a photochromic coating, or a dyed coating. Preferably, the LbL coating of the invention is applied on the outermost layer of an anti-reflecting coating.

The anti-reflective coating which may be used in the invention may be any well known anti-reflective, typically a stack of high refractive (HI) and low refractive (LI) index layers.

The refractive indices are measured by using an infrared ellipsometer at 634 nm. This method is disclosed in A. Brunet-Bruneau et al., J. Appl. Phys., 2000, 87, 7303-7309 and A. Brunet-Bruneau et al., Thin Solid Films, 2000, 377, 57-61.

As used herein, a law refractive index layer is intended to mean a layer with a refractive index n of 1.55 or less, preferably lower than 1.50 and even better lower than 1.45, and a high refractive index layer is intended to mean a layer with a refractive index n' higher than 1.55, preferably higher than 1.6, more preferably higher than 1.8 and even better higher than 2.

HI layers are classical high refractive index layers and may comprise, without limitation, one or more mineral oxides such as $ZrO_2$, $TiO_2$, $Ta_2O_5$, $Na_2O_5$, $Pr_2O_3$, $PrTiO_3$, $La_2O_3$, $Dy_2O_5$, $Nb_2O_5$, $Y_2O_3$, mixtures thereof. HI layers may optionally contain law refractive index materials such as silica and/or alumina. Obviously, mixtures of those compounds are such that the refractive index of the resulting layer is as defined above (higher than 1.55).

LI layers are also well known and may comprise, without limitation, $SiO_2$, $SiO_x$, with $1 \leq x < 2$, $MgF_2$, $ZrF_4$, $AlF_3$, chiolote ($Na_5Al_3F_{14}$), cryolite ($Na_3AlF_6$), mixtures of $SiO_2$ and/or SiOx with at most 10% by weight of $Al_2O_3$, and mixtures thereof. Obviously, mixtures of those compounds are such that the refractive index of the resulting layer is as defined above (lower than or equal to 1.55).

Generally, HI layers and LI layers, have a physical thickness, ranging from 10 to 120 nm.

The anti-reflecting stack of the present invention may include any layer or stack of layers which improves the anti-reflective properties of the finished optical article over at least one portion of the visible spectrum, thereby increasing the transmission of light and reducing surface reflectance.

Preferably, the multi-layer antireflecting stack comprises, in addition to the innermost and outermost layers, at least one LI layer and at least two HI layers. Preferably, the total number of layers in the anti-reflecting coating is ≤9, preferably ≤7.

LI and HI layers are not necessarily alternated in the anti-reflecting stack, although the anti-reflecting coating may comprise an alternated stack of law refractive index and high refractive index layers according to a particular embodiment of the invention. Two or more HI layers may be deposited on one another; two or more LI layers may be deposited on one another.

In general, the total thickness of the antireflecting stack is less than 1.5 µm, preferably 1 µm or less, and even better 0.5 µm or less, and generally ranging from 0.2 to 0.5 µm.

The HI and LI layers are generally applied by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

These different methods are described in "Thin Film Processes" and "Thin Film Processes II", Vossen & Kern, Ed., Academic Press, 1978 and 1981, respectively. Said evaporation under vacuum is a particularly recommended method.

These layers can also be applied by applying liquid solutions, preferably by a spin-coating process.

According to the invention, polysaccharides polymers are preferably selected from the group consisting of polysaccharides comprising glucosamine units and polysaccharides comprising carboxylic acid groups.

According to a preferred embodiment, said polysaccharides comprising glucosamine units are chosen from chitosan and poly(1,3-β-D-glucosamine-alt-1,4-β-D-glucuronic acid).

According to another preferred embodiment, said polysaccharides comprising carboxylic acid groups are chosen from carboxyalkylcelluloses such as carboxymethyl cellulose, carboxyethyl cellulose, or carboxypropyl cellulose, alginates, xanthans and mixtures thereof.

Colloids of silicon oxide are preferably chosen from surface amino-functionalized $SiO_2$ nanoparticles and surface negatively charged $SiO_2$ nanoparticles, for example by means of negatively charged groups such as pyridine, sulfonate, or sulfate groups.

As previously mentioned, the last layer of the multilayered coating of the invention comprises an LbL coating which is directly in contact with the environmental atmosphere (usually air).

In a preferred embodiment of the invention, the LbL coating of the invention comprises:

a) a first layer of chitosan as compound A and a second layer of carboxymethyl cellulose as compound B; or b) a first layer of aminopropyl-functionalized $SiO_2$ nanoparticles as compound A and a second layer of carboxymethyl cellulose as compound B; or c) a first layer of chitosan as compound A and a second layer of $SiO_2$ as compound B.

The LbL coating application process involves the sequential dipping, spraying or spin-coating of solutions of the specific constituents. The deposition of each cycle of complementary compounds A and B creates a "bilayer".

For convenience in expressing the assembled system, the following notation is commonly used: (Compound A/Compound B)$_n$, wherein n is the number of bilayers that have been deposited. For examples, a ten layer assembly comprising chitosan (CTS) as compound A and carboxymethyl cellulose (CMC) as compound B is noted (CTS/CMC)$_{10}$. Sometimes the LbL coating may comprise one additional layer of one of the above disclosed constituents. Therefore, for example a LbL assembly of ten bilayers of CTS and CMC including one additional CTS layer is noted (CTS/CMC)$_{10.5}$.

Although the LbL coating may comprise 2 to 20 bilayers, it preferably comprises 8 to 15 bilayers and more preferably 8 to 12 bilayers.

Typically, the LbL coating will have a physical thickness ranging from 30 to 120 nm, preferably from 60 to 100 nm.

As indicated above, the LbL coating is crosslinked through bondings between $NH_2$ and COOH group.

Before the crosslinking step d), the LbL coating is at least partially dried, preferably in the air, at ambient temperature during typically 5 minutes to 1 hour, preferably 10 to 20 minutes.

Then the crosslinking step is performed using the aqueous composition comprising at least tetrakis(2-hydroxyethyl) orthosilicate (THEOS) as crosslinking agent to induce chemical linkages between compounds A and B.

According to a preferred embodiment, the amount of THEOS in said crosslinking aqueous solvent-based composition ranges from 0.1 to 10 weight % of the total weight of said composition, preferably from 0.2 to 5 wt % and more preferably from 0.5 to 1 wt %.

According to another preferred embodiment, said crosslinking step d) is carried out by thermal annealing at a temperature ranging from 30° C. to 120° C., preferably from 40° C. to 100° C., more preferably from 50 to 70° C., for a period of 0.5 to 12 hours, preferably 1 to 3 hours.

Obviously, the process of the invention can also be used with new designed AR stacks.

The present invention will now be described with reference to the following examples.

EXAMPLES

1—Testing Methods

The following test procedures were used to evaluate the optical articles prepared according to the present invention.

a) Haze Value and Rv

The haze value of the final optical was measured by light transmission using the Haze-Guard Plus haze meter from BYK-Gardner (a color different meter) according to the method of ASTM D1003-00, which is incorporated herein in its entirely by reference. All references to "haze" values in this application are by this standard. The instrument was calibrated according to the manufacturer's directions. Then, the samples were positioned on the transmission light beam of the pre-calibrated meter and the haze value was recorded from three different specimen locations and averaged.

The main reflectance factor Rv is such as defined in ISO standard 13666:1998 and measured in accordance with ISO standard 8980-4, i.e. it is the balanced average spectral reflection in the visible spectrum in the wavelengths limits ranging from 380 nm to 780 nm. An anti-reflecting coating provides a $R_V$ of less than 2.5% per face of a coated lens.

The mean reflectance $R_m$ is the mean value (not balanced) of the spectral reflectance over a wavelength range 400 nm to 700 nm.

b) Adhesion (Hand Wiping Test)

The convex side of a coated lens surface is hand-wiped with a dry or wet microfiber cloth. The lens is wiped for 50 strokes (one stroke: one back and one forth actions), air dried. After wiping, the coated lens is under visual inspection.

There are four levels of adhesion after the wiping test, determined by scratch numbers observed in a square 100 μm×100 μm micro-photograph of the rubbed surfaces.

| Adhesion | |
|---|---|
| Excellent: No scratches (0) | Middle: Many scratches (>5) |
| Good: Few scratches (≤5) | Bad: Removal (partial coating peeled off) | c) Fog Test According to EN 168 Standard

The antifog properties were evaluated by an apparatus slightly modified from European Standard Test (EN168). The ambient temperature during the measurement is 23±5° C. The temperature of the water bath is set at 50±0.5° C. The air above the water bath is circulated using a ventilator, so that it becomes saturated with water vapor. During this time, the measurement opening is to be covered. The ventilator is switched off before measurement. The samples must be placed in the test position within 2 s of the opening being uncovered.

To measure the transmittance change, the sample is placed on the seating ring, with one side exposed to the water vapor and the upper side exposed to the air. The relative transmittance (Tr) is recorded as Tr %=(Tf/Ti)*100=(If/Ii)*100, where the initial transmittance (Ti) is determined by laser intensity (Ii) passing through the sample in the non-fogging conditions, and the transmittance (Tf) is determined by laser intensity (If) passing through the sample during the fogging condition. The measurement spectrum shows the change of Tr during a measurement time from 0 to 120 s.

Two Tr data at 60 s and 120 s of each sample are listed in the table for sample comparison. A poor antifog lens sample exhibits <50% of Tr at 60 s and 120 s while a good antifog lens sample exhibits 80-100% of Tr at 60 s and 120 s.

2—Preparation of the Substrates

ZQZ lens: An Orma® lens substrate (obtained by polymerizing CR-39® diethylene glycol bis ((allyl carbonate) monomer), is dip-coated with 3.5 μm of an abrasion-resistant and/or an anti-scratch coating ("Mithril" hard coat) disclosed in example 3 of the patent EP 0614957 (refractive index 1.50) and then said hard coat is coated by vacuum deposition of three inorganic oxide stacks in the indicated order (zirconia 26 nm/silica 22 nm/zirconia 87 nm).

More precisely, said hard coat is based on a hydrolysate of y-glycidoxypropyltrimethoxysilane (GLYMO) and dim-ethyldiethoxysilane (DMDES), with colloidal silica and aluminum acetyl acetonate. This hard coat was 3-6 μm, deposited directly onto the substrate, such as Orma® or polycarbonate (PC).

ZQZQ lens: An Orma® lens is dip-coated with 3.5 μm of hard coat as above and then vacuum deposited with four inorganic oxide stacks in the indicated order (zirconia 26 nm/silica 22 nm/zirconia 88 nm/silica 13 nm).

Hard coated PC lens: A polycarbonate lens coated with 5-6 μm of hard coat.

Glass lens: Refractive index 1.50.

$SiO_2$ coated lens: An Orma lens is dip-coated with 3.5 μm of hard coat as above and then vacuum deposited with a $SiO_2$ layer (100 nm).

3—Experimental Details

A LbL coating is applied onto both sides of a substrate according to the general process describes below:
   I. Surface cleaning: A lens substrate is first dipped in an ultrasonic caustic solution, and then rinsed in ultrasonic deionized (DI) water and air dried.
   II. Coating process: The lens is dipped in a polycation solution, followed with a rinsing step in two agitated DI water baths; and then dipped in a polyanion solution, followed with a rinsing step in two agitated DI water baths. This process is repeated for (n-1) times and then air dried for 20-30 minutes to get a coating with n bilayers of (polycation/polyanion), written as (polycation/polyanion)$_n$.

III. Post-treatment: In some case, the coating is treated in a crosslinking agent solution, then rinsed by water and cured at 50° C. for 2-3 hours.

Name and conditions of chemicals used here:

Polycation: chitosan (CTS, low molecular weight, used at 0.1 wt % in water, added with 0.2 wt % of acetic acid for solubility improvement, pH=3.5 or 4.0) and ApSiO$_2$ (Aminopropyl functionalized silica nanoparticles) (15 nm, used at 0.03 wt % in water, pH=4.0) purchased from Sigma-Aldrich.

Polyanion: carboxyl methyl cellulose purchased from Sigma-Aldrich (CMC, Mw=250,000, used at 0.1 wt % in water, pH=4.0), silica nanoparticles (A2034, used at 0.03 wt % in water, pH=3.5).

Crosslinking agent: tetrakis(2-hydroxyethyl) orthosilicate (THEOS, 0.5 or 1 wt %), 1-ethyl-3-[3-dimethylaminopropyl]carbodiimide hydrochloride (EDC), N-hydroxy succinimide (NHS), 2-(N-morpholino)ethanesulfonic acid buffer solution (MES, 0.05M, pH=5.0).

The LbL coating application process involves the sequential dipping, spraying or spin-coating of solutions of the specific constituents. The deposition of each cycle of complementary polymers creates a "bilayer".

For convenience in expressing the bilayer system, the following notation is used: (polycation)/(polyanion)$_n$. Polycation and polyanion are the abbreviations of the specific polyelectrolytes used in LbL assembly and n is the number of bilayers that have been deposited. For example, a ten bilayers assembly comprising CTS and CMC is noted as (CTS/CMC)$_{10}$.

Examples E1-1, E1-2, E1-3 According to the Invention and Comparative Examples CE1-1, CE1-2 and CE1-3

Anti-Reflective (CTS/SiO$_2$) LbL Coatings

A partial antireflective (AR) stack coated lens (ZQZ; ZQZQ) or PC Airwear® substrate was first treated with air plasma for 45 s.

In the LbL coating process, the treated lens was dipped in 0.1 wt % of CTS solution (added with 0.2 wt % of acetic acid, pH=3.5) for 3 min, followed with a rinsing step in two agitated DI water baths (2 min in the first one, 1 min in the second one); and then dipped in 0.03 wt % of SiO$_2$ solution (pH=3.5) for 3 min, followed with a rinsing step in two agitated DI water baths (2 min in the first one, 1 min in the second one). The agitation speed was 100 rpm. This process was repeated for another (n−1) times to get the final LbL coating.

Example E1-1

The LbL process was repeated for 5 times and then (CTS/SiO$_2$)$_6$ coating on ZQZ lens was dipped in 1 wt % of THEOS aqueous solution for 3 h.

Example E1-2

The LbL process was repeated for 3 times and then (CTS/SiO$_2$)$_4$ coating on ZQZQ lens was dipped in 0.5 wt % of THEOS solution for 3 h.

Example E1-3

The LbL process was repeated for 3 times and then (CTS/SiO$_2$)$_4$ coating on hard coated PC lens was dipped in 1 wt % of THEOS solution for 1 h, then rinsed with water and dried in the oven at 50° C. for 3 h.

Three comparison examples (CE1-1, CE1-2, and CE1-3) were respectively prepared according to the process used above for Examples E1-1, E1-2 and E1-3 with the exception that they were not treated with THEOS, but just dried in the oven at 50° C. for 3 h.

The hand wiping properties of the prepared lenses have been evaluated and are reported in table 1 below:

TABLE 1

| Sample | Lens | LbL coating | THEOS, wt % | Haze, % | Rm*, % | Rv*, % | Hand wiping* (50 strokes) Dry cloth | Wet cloth |
| --- | --- | --- | --- | --- | --- | --- | --- | --- |
| E1-1 | ZQZ | (CTS/SiO$_2$)$_6$ | 1 | 0.37 | 0.65 | 0.09 | Excellent | Excellent |
| CE1-1 | | | No | 0.31 | 1.38 | 0.51 | Bad | Bad |
| E1-2 | ZQZQ | (CTS/SiO$_2$)$_4$ | 0.5 | 0.22 | 1.32 | 0.73 | Excellent | Excellent |
| CE1-2 | | | No | 0.20 | 1.79 | 1.24 | Middle | Middle |
| E1-3 | Hard coated PC | (CTS/SiO$_2$)$_4$ | 1 | 0.19 | 0.95 | 0.82 | Excellent | Excellent |
| CE1-3 | | | No | 0.18 | 0.82 | 0.61 | Middle | Good |

*Rm, Rv, and hand wiping tests conducted on the convex side of a lens.

These results show that the lenses prepared according to the process of the invention exhibit good antireflecting properties as well as excellent adhesion properties of the LbL coatings to the lens substrates.

In the absence of the treatment with the crosslinking THEOS solution, the adhesion properties of all LbL coatings were bad, middle or occasionally good in the hand wiping test.

The refractive index of (CTS/SiO$_2$) LbL coatings at 634 nm was 1.31 measured by ellipsometer, and increased to 1.34-1.36 after the treatment with THEOS in different conditions; while the decrease of the coating thickness was in the range of 10-20 nm.

Overall, it appears that the use of THEOS does not significantly modify the reflection percentage of the antireflecting coating in function of the wavelength (Rv and Rm %).

Example E2 According to the Invention and Comparative Example CE2

(ApSiO$_2$/CMC) LbL Coatings

A glass lens substrate was first treated with air plasma for 45 s. Then the lens was dipped in 0.03 wt % of an aminopropyl-functionalized SiO$_2$ (ApSiO$_2$) aqueous solution (pH=4.0) for 3 min, followed with a rinsing step in two agitated DI water baths (2 min in the first one, 1 min in the second one); and then dipped in an aqueous 0.1 wt % CMC solution (pH=4.0) for 3 min, followed with a rinsing step in two agitated DI water baths (2 min in the first one, 1 min in the second one). The agitation speed was 100 rpm. This process was repeated for another 7 times and then the lens was dried in air to get the $(ApSiO_2/CMC)_8$ coating.

The coating was then dipped in 1 wt % of THEOS aqueous solution for 1 h, then rinsed with water and dried in the oven at 50° C. for 3 h. A comparison example (CE2) was prepared according to the same process except the coating was not treated with THEOS, but also dried in the oven at 50° C. for 3 h. The index of $(ApSiO_2/CMC)$ coatings at 634 nm was 1.42, and increased to 1.47 after the treatment with THEOS; while the coating thickness was decreased from 72 nm to 63 nm.

The hand wiping properties for each of the prepared coated have been evaluated and are reported in table 2 below:

TABLE 2

| Sample | Lens | LbL coating | THEOS, wt % | Haze, % | Hand wiping (50 strokes) | |
|---|---|---|---|---|---|---|
| | | | | | Dry cloth | Wet cloth |
| E2 | Glass | $(ApSiO_2/CMC)_8$ | 1 | 0.34 | Excellent | Excellent |
| CE2 | | | No | 0.32 | Good | Good |

These results show that the lens prepared according to the process of the invention exhibit excellent adhesion properties of the LbL coating to the lens substrates. In the absence of the treatment with the crosslinking THEOS solution, the comparative LbL coating shows good but lower adhesion properties to the lens substrate.

Example E3 According to the Invention and Comparative Example CE3

Antifog (CTS/CMC) LbL Coatings

A $SiO_2$ coated lens substrate was first treated with air plasma for 45 s. Then the lens was dipped in 0.1 wt % of CTS solution (added with 0.2 wt % of acetic acid, pH=4.0) for 3 min, followed with a rinsing step in two agitated DI water baths (2 min in the first one/1min in the second one); and then dipped in 0.1 wt % of CMC solution (pH=4.0) for 3 min, followed with a rinsing step in two agitated DI water baths (2 min in the first one/1min in the second one). The agitation speed was 100 rpm. This process was repeated for another 9 times and then air dried to get the $(CTS/CMC)_{10}$ coating.

In crosslinking process, the LbL coating was first dipped in a crosslinking aqueous solution, 0.05M of MES buffer solution, containing 0.2M of EDC and 0.05M of NHS for 1 h, and rinsed by water and dried in air. Then the coating was dipped in 1 wt % of THEOS aqueous solution for 3 h, then rinsed with water and dry in the oven at 50° C. for 3 h (corresponds to example E3 according to the invention).

A comparison example (CE3) was treated with a carbodiimide coupling agents EDC combined with N-hydroxysuccinimide (NHS) in a 2-(N-morpholino)ethanesulfonic acid buffer solution (MES), according to the same process than example E3 but then not treated with THEOS. Then the coating has been dried in the oven at 50° C. for 3 h.

The hand wiping properties for each of the prepared coated have been evaluated and are reported in table 3 below:

TABLE 3

| $SiO_2$ coated lens | LbL coating | THEOS, wt % | Haze, % | Relative T*, % | | Hand wiping (50 strokes) | |
|---|---|---|---|---|---|---|---|
| | | | | 60 s | 120 s | Dry cloth | Wet cloth |
| E3 | $(CTS/CMC)_{10}$ | 1 | 0.45 | 83 | 84 | Excellent | Excellent |
| CE3 | | No | 0.41 | 86 | 85 | Good | Bad |

The result shows that only the lens treated with crosslinking agent THEOS exhibits excellent adhesion properties of the LbL coating to the substrate.

The invention claimed is:

1. A process for the manufacturing of an optical article comprising:
    a) providing an uncoated or coated substrate,
    b) forming on at least one face of said substrate a multilayered coating,
    c) forming on an outermost layer of said multilayered coating, a layer-by-layer (LbL) coating exposed to environment, said LbL coating comprising at least two bilayers, each bilayer being formed successively by:
        i) applying a first layer composition comprising at least one compound A having a first electrical charge;
        ii) applying, directly onto the first layer resulting from i), a second layer composition comprising at least one compound B having a second electrical charge, said second electrical charge being opposite to said first electrical charge;
        iii) repeating at least once steps i) and ii),
        with the provisos that:
            each of compounds A and B is independently a polysaccharide polymer or colloid of metal oxide, with the proviso that at least one of the compounds A and B is a polysaccharide polymer;
            each of said compounds A and B is positively or negatively charged respectively; and
    d) crosslinking the first and second layers of said bilayers of the LbL coating by treatment with an aqueous composition comprising at least from 0.2 to 5 weight % of the total weight of said composition of tetrakis(2-hydroxyethyl) orthosilicate (THEOS) as a crosslinking agent to induce chemical linkages between compounds A and B.

2. The process of claim 1, wherein at least one compound A or B is a colloid of metal oxide further defined as comprising $TiO_2$, and $ZrO_2$, or silicon oxide.

3. The process of claim 2, wherein said colloid of metal oxide is further defined as silicon oxide comprising surface amino- functionalized $SiO_2$ nanoparticles and/or surface negatively charged $SiO_2$ nanoparticles.

4. The process of claim 1, wherein said polysaccharide polymers comprise at least one polysaccharide comprising a glucosamine unit or polysaccharide comprising a carboxylic acid group.

5. The process of claim 4, wherein said polysaccharide comprises a glucosamine unit and is further defined chitosan or poly(1,3-β-D-glucosamine-alt-1,4-β-D-glucuronic acid).

6. The process of claim 4, wherein said polysaccharide comprises a carboxylic acid group and is further defined as comprising carboxyalkylcellulose, alginate, and/or xanthan.

7. The process of claim 6, the polysaccharide is a carboxyalkylcellulose further defined as carboxymethyl cellulose, carboxyethyl cellulose, or carboxypropyl cellulose.

8. The process of claim 1, wherein each bilayer of said LbL coating comprises:
- a first layer of chitosan as compound A and a second layer of carboxymethyl cellulose as compound B; or
- a first layer of aminopropyl-functionalized $SiO_2$ nanoparticles as compound A and a second layer of carboxymethyl cellulose as compound B; or
- a first layer of chitosan as compound A and a second layer of $SiO_2$ as compound B.

9. The process of claim 1, wherein the amount of THEOS in said crosslinking aqueous solvent-based composition ranges from 0.5 to 1 weight % of the total weight of said composition.

10. The process of claim 1, wherein said crosslinking step d) is carried out by thermal annealing at a temperature ranging from 30° C. to 120° C. for a period of 0.5 to 12 hours.

11. The process of claim 10, wherein said crosslinking step d) is carried out by thermal annealing at a temperature ranging from 30° C. to 120° C. for a period of 1 to 3 hours.

12. The process of claim 11, wherein said crosslinking step d) is carried out by thermal annealing at a temperature ranging from 50 to 70° C.

13. The process of claim 10, wherein said crosslinking step d) is carried out by thermal annealing at a temperature ranging from 40° C. to 100° C.

14. The process of claim 1, wherein the LbL coating is at least partially dried before the crosslinking step d) is carried out.

15. The process of claim 1, wherein said multilayered coating is an antireflecting coating further comprising a stack of low refractive index layers (LI layers) having a refractive index n ≤1.55 and high refractive index layer (HI layers) having a refractive index n' >1.55, said multilayered coating being deposited onto the substrate through a vacuum evaporation process.

16. The process of claim 15, wherein:
- the LI layers are made of $SiO_2$, $SiO_x$, with 1≤x<2, $MgF_2$, $ZrF_4$, $AlF_3$, chiolote ($Na_5Al_3F_{14}$), cryolite ($Na_3AlF_6$), mixtures of $SiO_2$ and/or $SiO_x$ with at most 10% by weight of $Al_2O_3$, and mixtures thereof; and
- the HI layers are made of $ZrO_2$, $TiO_2$, $Ta_2O_5$, $Na_2O_5$, $Pr_2O_3$, $PrTiO_3$, $La_2O_3$, $Dy_2O_5$, $Nb_2O_5$, $Y_2O_3$, mixtures thereof, and mixtures of these oxides with silica and/or alumina.

17. An optical article formed by the process of claim 1.

18. The optical article of claim 17, wherein each bilayer of said LbL coating comprises a first layer of chitosan as compound A and a second layer of carboxymethyl cellulose as compound B.

19. The optical article of claim 17, wherein each bilayer of said LbL coating comprises a first layer of aminopropyl-functionalized $SiO_2$ nanoparticles as compound A and a second layer of carboxymethyl cellulose as compound B.

20. The optical article of claim 17, wherein each bilayer of said LbL coating comprises a first layer of chitosan as compound A and a second layer of $SiO_2$ as compound B.

21. The optical article of claim 17, wherein the amount of THEOS in said crosslinking aqueous solvent-based composition ranges from 0.5 to 1.0 weight % of the total weight of said composition.

* * * * *